INVENTOR.
CLIFFORD H. SNYDER
BY
HIS ATTORNEY

Oct. 29, 1968   C. H. SNYDER   3,407,847
VALVED COUPLING

Filed July 19, 1965   4 Sheets-Sheet 3

INVENTOR.
CLIFFORD H. SNYDER
BY *George Raynovich*
HIS ATTORNEY

United States Patent Office 3,407,847
Patented Oct. 29, 1968

3,407,847
VALVED COUPLING
Clifford H. Snyder, Imperial, Pa., assignor to SRM
Company, a corporation of Pennsylvania
Filed July 19, 1965, Ser. No. 473,073
3 Claims. (Cl. 137—614.06)

ABSTRACT OF THE DISCLOSURE

A swivel valved coupling is provided which consists of a nipple and a housing to rotatably receive the nipple. Both the housing and the nipple have flow control valves therein. The flow control valve in the housing is controlled by a handle having a cam interlock means. The cam interlock means on the valve handle prevents the valve from being opened when the coupling is disengaged and also prevents the coupling from being disengaged when the valve is open. The nipple is axially retained within the housing by a plurality of locking balls which move radially relative to the housing to alternately lock and release the nipple within the housing. The arrangement of the locking balls, the housing, and the nipple permits the nipple to rotate 360° relative to the housing thereby providing a full swiveling coupling. The coupling can swivel whether the valves in the housing and the nipple are opened or closed and whether or not there is fluid pressure within the coupling.

The present invention relates to a quick connect, valved coupling, and more particularly to a valved coupling for releasably connecting two fluid vessels or conduits into fluid communication with each other and then disconnecting or separating the vessels or conduits with practically no loss of fluid and closing both conduits prior to separation.

In many industrial and commercial applications, it is necessary to releasably connect two fluid conduits or fluid vessels into fluid communication with each other so that liquid or gases may be allowed to flow from one vessel into another. Once the required flow has been accomplished, it is necessary to close or stop the flow from one conduit to another to hold the fluid in each conduit and then to release the conduits, one from the other with practically no spillage, while maintaining the conduits valved closed.

Couplings heretofore used are very complex, containing a great number of parts, many of which, because of coupling design are fragile and contain a large number of seals, many of which are not readily accessible. These couplings are so designed that the body and nipple when in operating position are generally in fixed relationship each to the other so that it is necessary to provide a separate swivel joint to obtain the desired rotatable relationship of two conduits.

The present invention provides a simple coupling with few parts and with a built-in 360° swivel.

The present invention relates to a valved coupling which has a housing and a nipple. The housing receives the nipple and connects the two conduits or vessels, one of which is fixed to the housing, and the other of which is fixed to the nipple. Further, each of the elements of the present coupling contains a valve. The housing portion contains a master valve which is operated by a handle to the opened or closed position. The nipple contains a slave valve which is spring loaded to the closed position but which, when the coupling is assembled, contacts the master valve and so is moved to the open position when the master valve of the housing is opened.

The present invention permits automatic insertion of the nipple into the housing. This automatic insertion may be made simply by pushing the nipple into the housing.

The present invention permits full 360° swivel of the nipple in relation to the housing whether the valves are closed or open and even when the coupling is under normal operating pressure.

The coupling of the present invention has a valve interlock cam which cooperates with the coupling locking mechanism to program the squence of operation of the valve elements within the coupling and the coupling lock mechanism which locks the nipple within the housing.

The interlock cam of the present invention, which is fixed to the valve stem of the master valve within the housing portion of the coupling, prevents the master valve from being moved to the open position if the coupling is disconnected. When the coupling is connected, or assembled, and the nipple is in position within the housing, and locked therein, the interlock cam is freed and the master valve within the housing may be opened manually. At the same time, the slave valve within the nipple is opened by the movement of the master valve.

So long as the master valve is in the open position, the interlock cam on the valve stem prevents the coupling from being disconnected. When it is desired to disconnect the coupling, the master valve within the housing must first be manually moved to the closed position. At that time, the slave valve within the nipple moves under the influence of spring tension to the closed position also. It is only after the valves have been closed that the coupling may be disconnected. When the coupling of the present invention is disconnceted it breaks dry in that there is no leakage of fluid from either half of the coupling.

The coupling of the present invention is particularly adapted for use with tank trucks or tank cars which load and carry petroleum. In loading petroleum, a loading arm is utilized to conduct fluid from the storage tanks to the tank truck. The loading arm has a coupling housing fixed thereto and the coupling housing is brought into contact with a nipple that is fixed to the tank truck or tank car. Thus, the nipple is a permanent installation on the tank truck or tank car while the housing of the coupling is a permanent installation on the loading arm within the oil or petroleum storage area.

The couplings may be relatively large in size, having flow passages which are four to six or eight inches in diameter. Further, because of their location and the type of service they perform, the couplings are subjected to rough usage and must be of rugged construction to withstand the heavy use.

The valved coupling of the present invention is ideally suited for use in loading tank trucks and cars. Several features of the valve coupling of the present invention make it particularly well suited for such use. Among these features are the fact that the valves within the housing and nipple have been so designed, and the valve seats have been so positioned, that there is a large area of flow available when the valves are open. The large flow area may be substantially the same as or greater than the flow area available in the conduit size which the coupling is adapted to couple. The coupling is designed internally so as to reduce friction flow loss to a minimum. Accordingly, I have found that with the coupling of my invention, it is possible to load a tank truck or a tank car in one-third the time that has previously been required for couplings which the present coupling is replacing.

Further, the valves in the coupling and nipple are so constructed that they may be opened and closed under pressure so that there is no requirement for any additional valves further upstream to control flow through the coupling. Thus, the coupling of the present invention, when the housing is located on the loading arm, and the nipple on a tank truck or tank car, needs only have the coupling assembled and the single valve opened to permit loading of the car. When the loading is completed, closing of the valves by turning a single handle and withdrawal of the nipple completes the operation without spillage.

Another feature of the present invention which makes it extremely valuable for loading tank cars and tank trucks is the fact that the nipple and the housing which mate are each cylindrical, and have no key positions or other interruptions in the cylindrical surfaces. Accordingly, the nipple may be inserted into the housing at any one of 360° of rotational movement relative to the housing. Thus, the nipple may be inserted in one position at one point, and at a later time may be inserted at a position turned 180° relative to the housing at another point.

In use, it has been found that the nipple of a coupling utilized on a tank truck or tank car is subjected to heavy use and wears out and is damaged quicker than any other part of a coupling. In the coupling of the present invention, the end of the nipple, which is subjected to heavy use, has been made replaceable by having that portion of the nipple thread onto the nipple body. Accordingly, the nipple of the present invention has a replaceable end portion. This end portion also may be used as a dummy nipple which allows the housing master valve to be opened while disconnected from the nipple in order to drain fluid from the conduit and housing. Further, the housing of the present invention has been provided with a rubber bumper to help guide the nipple into the housing as well as to prevent damage to the nipple end.

The coupling of the present invention has been designed so that it is relatively short in length. This is an advantage in that the coupling does not occupy an extreme amount of space and the nipple does not protrude excessively from the tank truck or tank car. Further, even though the present coupling is of short length, its valve movement and interior design are such that full flow through the coupling occurs and full flow permits quicker, easier loading.

To help connect and disconnect the coupling, the reciprocating sleeve which locks the coupling in place, as will hereinafter be explained, has been provided with operating handles which are a new feature in a coupling of this type. The operating handles serve the dual purpose of guiding the housing onto the nipple and, at the same time, are utilized to release the coupling when it is desired to disconnect it.

With the foregoing considerations in mind, it is an object of the present invention to provide an improved valve coupling which will handle flow in either direction.

Another object of the present invention is to provide a valved coupling which has a large flow area therethrough when the valves are open.

Another object of the present invention is to provide a valved coupling in which the valves can be opened and closed under pressure.

Another object of the present invention is to provide a valved coupling with an interlock which prevents the valves from being opened when the coupling is disconnected and thus prevents accidental spillage.

Another object of the present invention is to provide a valved coupling with an interlock means which requires that the coupling be locked together before the valves can be opened.

Another object of the present invention is to provide a valve control means which automatically pulls the nipple all the way into the housing and to the locked position while opening the valves and in case the nipple had not been fully inserted.

Another object of the present invention is to provide an automatic coupling wherein the nipple will, when pushed the proper distance into the housing, be automatically locked into the housing.

Another object of the present invention is to provide a dry-break coupling which will permit a full swivel of the nipple in the coupling housing whether the valves are open or closed or even partially closed, and whether or not the coupling is under pressure.

Another object of the present invention is to provide a valved coupling in which the nipple can be inserted relative to the housing at any one of 360° of rotation.

Another object of the present invention is to provide a nipple for the coupling which has a readily replaceable end portion.

Another object of the present invention is to provide a coupling having a relatively short overall length.

Another object of the present invention is to provide a simple, rugged, foolproof dry-break coupling which may be instantly connected, the valves of which may be opened or closed instantly and the coupling disconnected instantly.

Still another object of the present invention is to provide a quick connect coupling wherein pushing of the nipple into the housing even though the nipple is out of alignment with the housing causes the nipple and housing to come into alignment and lock together in an operable relationship.

Another object of the present invention is the provision of a relatively few number of seals which are readily accessible for removal and replacement.

Another object of the present invention is to provide a slave valve guide means which prevents the valve from cocking.

Another object of this invention is to provide a housing so designed that the housing and its conduit may be readily drained by insertion of a dummy nipple which is the replaceable end portion of the standard nipple.

Another object of this invention is to provide a dry-break coupling which will operate under either positive or negative pressures.

These and other objects of the present invention will become apparent as this description proceeds in conjunction with the accompanying drawings.

Figure 1:
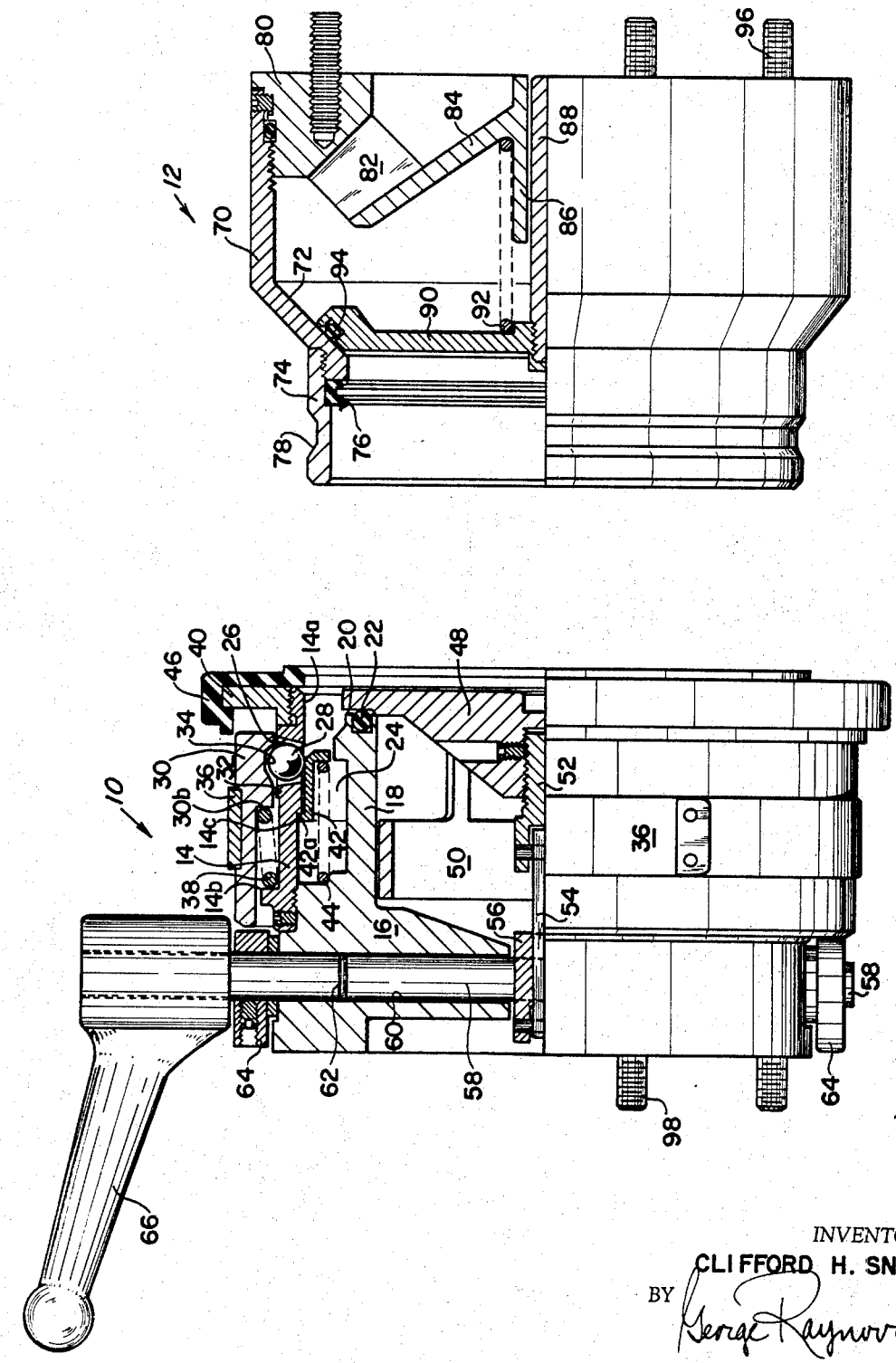
FIGURE 1 is an exploded view, in partial section, of the coupling of the present invention in the disconnected position.

Referring to the drawings, and particularly to FIGURE 1, the valved coupling shown in the disassembled position is formed generally from a housing 10 and a nipple 12.

The housing 10 has cylindrical body 14 which has a cylindrical internal surface 14a. Threaded into the cylindrical body 14 is a flow passage adapter 16 which has a cylindrical flow passage 18 that extends in generally concentric relation to the cylindrical body 14.

The cylindrical flow passage 18 terminates in an annular valve seat 20 that has an O-ring seal 22 retained therein. The concentrically positioned cylindrical body 14 and the cylindrical flow passage 18 form an annular nipple-receiving chamber 24 therebetween.

A plurality of radial passages 26 are formed in the cylindrical body 14 of housing 10. The radial passages 26 are all in the same axial plane and extend around the periphery of the housing body 14. Each of the radial passages 26 has positioned therein a locking ball 28. The locking balls 28 are free to move radially inwardly and outwardly in the passages 26 as will be hereinafter more fully explained.

Positioned radially outwardly of the cylindrical body 14 is an annular lock sleeve 30 which completely surrounds cylindrical body 14. The lock sleeve 30 has a lock surface 32 which extends into close proximity to the outer surface of cylindrical body 14. Further, a release groove 34 is formed adjacent to the lock surface 32 in body 14. The purpose of the lock surface 32 and the release groove 34 will become apparent as the operation of the coupling is discussed.

Figure 3:
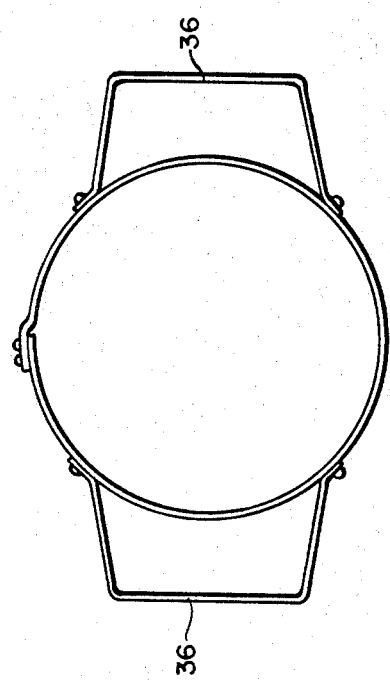
FIGURE 3 is a detailed view of the handles utilized to guide and to unlock the coupling.

The lock sleeve 30 has handles 36 formed thereon. The handles 36 provide hand grips for the lock sleeve which may be of relatively large diameter. The handles are best seen in FIGURE 3.

A coil spring 38 is disposed between a shoulder 14b on cylindrical body 14 and a shoulder 30b on annular lock sleeve 30 so that the annular lock sleeve 30 is continually urged to the right (as viewed in FIGURE 1) by spring 38. A retaining nut 40 is threaded onto cylindrical body 14 to retain the annular lock sleeve 30 on the cylindrical body 14.

A release collar 42 is positioned radially inwardly of the cylindrical body 14 of housing 10. The release collar 42 has a shoulder 42a which contacts a shoulder 14c on the body 14 when the release collar is moved to the right as viewed in FIGURE 1. A coil spring 42 positioned between adapter 16 and release collar 42 urges release collar 42 to the right as viewed in FIGURE 1 for a purpose to be hereinafter more fully described.

An annular rubber bumper 46 is positioned over the retaining nut 40 and protects the end of the nipple 12 when the nipple is inserted.

Figure 2:
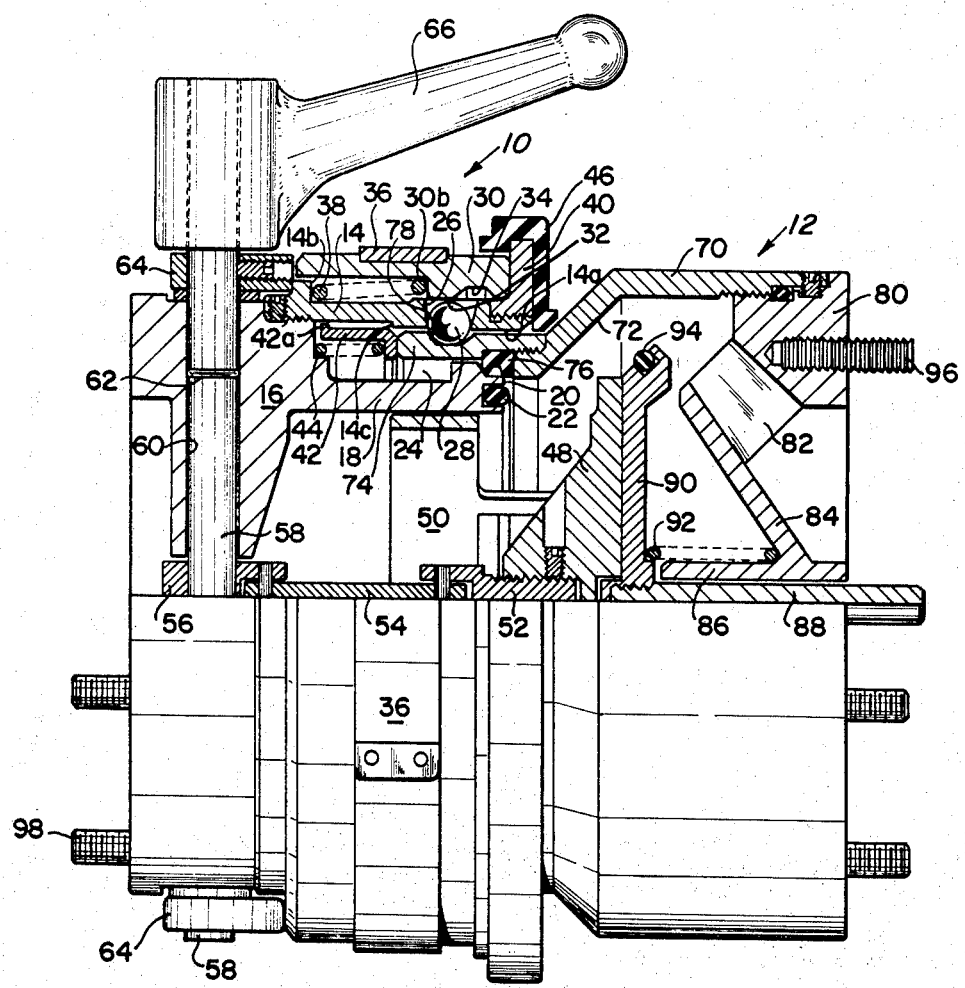
FIGURE 2 is a view, in partial section, of the coupling of FIGURE 1 in the assembled position.

A circular master valve element 48 is positioned within housing 10 to reciprocate between the closed position shown in FIGURE 1 and the open position shown in FIGURE 2. The master valve element 48 is connected to a cylindrical valve guide 50 which moves in piston-like fashion relative to the cylindrical flow passage 18 of flow passage adapter 16. The valve guide 50 insures that the master valve element 48 properly seats against the annular valve seat 20 on the end of cylindrical flow passage 18. A master valve connector 52 connects the master valve element 48 to master valve linkage 54 which in turn connects it to the master valve connecting link 56 that is non-rotatably fixed to the master valve stem 58.

The master valve stem 58 is journaled for rotation in passage 60 formed within the flow passage adapter 16. The passage 60 extends diametrically through the adapter 16 so that valve stem 58 protrudes on either end thereof. The seal 62 is provided on each end section of stem 58 to prevent leakage of fluid along stem 58.

Figure 4:
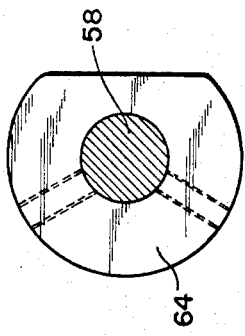
FIGURE 4 is a detailed view showing the shape of the interlock cam of the present invention.

On each end of valve stem 58 are non-rotatably secured interlock cams 64 which cooperate with the annular lock sleeve 30 in a manner to be hereinafter described. The shape of the interlock cams is best seen in FIGURE 4.

Figure 5:
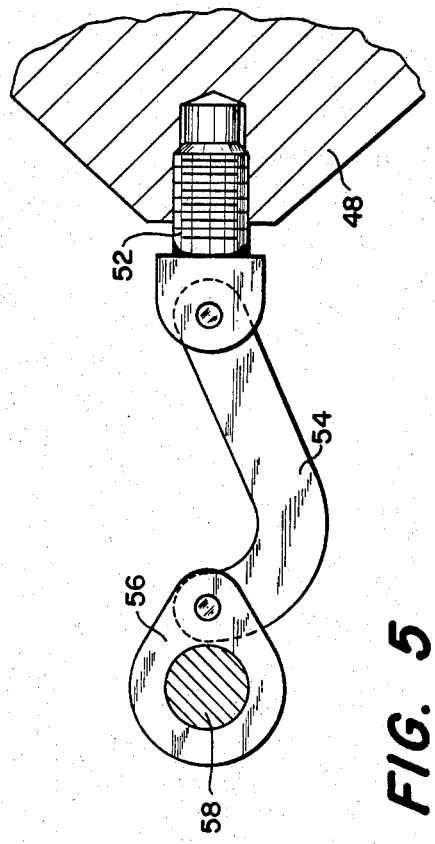
FIGURE 5 is a view showing the master valve linkage.

An operating handle 66 is non-rotatably secured to the valve stem 58 to rotate valve stem 58 and thereby rotate interlock cams 64 as well as to reciprocate the master valve element 48 through valve linkage 52, 54, and 56. This linkage is shown in FIGURE 5.

Figure 6:
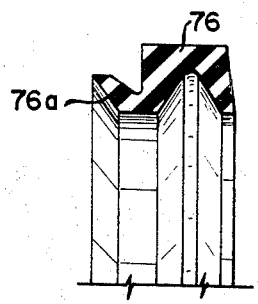
FIGURE 6 is a detailed view of the main nipple seal.
Figure 7:
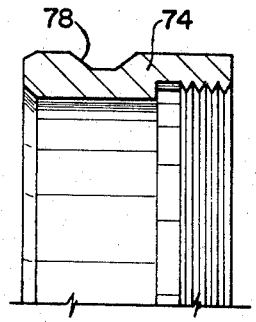
FIGURE 7 is a detailed view of the nipple replaceable end portion.

Again, referring to FIGURE 1, the nipple 12 is shown with a nipple body 70. The nipple body 70 has an internal frusto-conical surface which provides a frusto-conical valve seat 72. The nipple end 74 is threaded onto the nipple body 70 and may be replaced by simply unthreading and threading the new nipple end 74 onto nipple body 70. The nipple end 74 is shown in FIGURE 7 and may, when disassembled from the nipple body, be used as a dummy nipple to permit housing master valve opening for drainage purposes. A seal ring 76, better shown in FIGURE 6, is provided at the junction of the nipple body 70 and nipple end 74 and also serves to seal the nipple end to the housing 10 as will be more fully hereinafter explained. Seal ring 76 has an annular lip 76a which permits the seal to operate at both positive and negative pressures.

The external cylindrical surface of nipple end 74 has a lock groove 78 formed therein. The lock groove receives the locking balls 28 of housing 10 in a manner to be described. A valve adapter 80 is threaded into nipple body 70. The valve adapter 80 has fins 82 which support a central hub 84. The fins 82 permit fluid flow between the outer portion of the valve adapter 80 and the central hub 84. The hub 84 contains a cylindrical valve guide 86 which slidingly receives the slave valve stem 88.

A slave valve element 90 is fixed to the slave valve stem 88 and reciprocates therewith. A coil spring 92 is positioned between the hub 84 and the slave valve element 90 to urge the slave valve element 90 to the left as viewed in FIGURES 1 and 2.

The outer periphery of slave valve element 90 contains a seal 94 which contacts the valve seat 72 to seal the valve when it is in the closed position.

Studs 96 are fixed to nipple 12 to secure the nipple 12 to a tank truck body or to another conduit. Studs 98 are fixed to housing 10 to secure the housing to a storage plant loading arm or other conduit.

Figure 8:
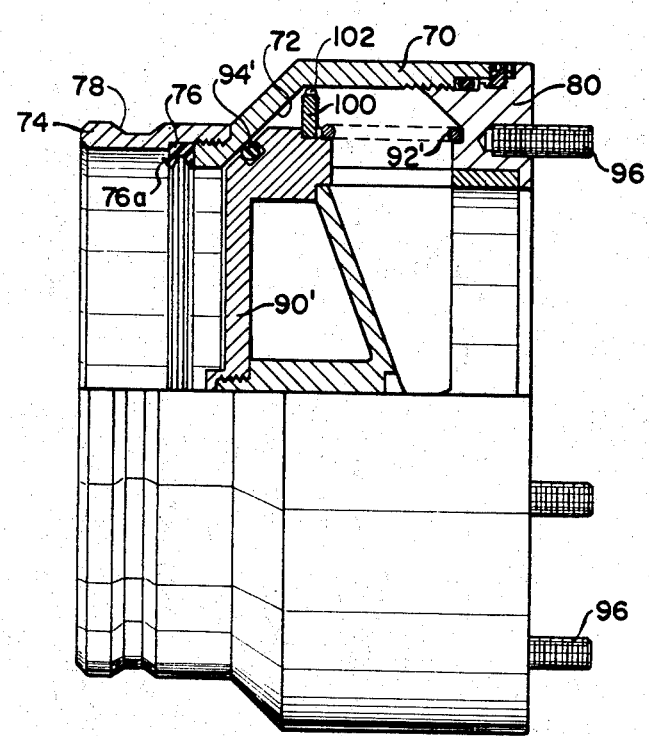
FIGURE 8 is a view of an alternative nipple valve guide mechanism similar to FIGURE 1.

FIGURE 8 shows an alternative nipple design having a modified slave valve element and valve guide. In FIGURE 8, the same reference numerals have been applied to the parts of the housing which are unchanged, while prime suffixes have been utilized to indicate similar parts. In FIGURE 8, the slave valve element 90' is urged to seat against the frusto-conical valve seat 72 by a coil spring 92'. A seal 94' is provided to seal the element 90' against the seat 72.

A valve guide 100 is provided with a plurality of nylon balls 102 set in the periphery thereof to ride along the cylindrical internal surface of the nipple body 70. In operation, the master valve element 48 bears against slave valve element 90' and forces it away from seat 72 against the force of spring 92'.

*Operation*

Considering the operation of the present invention, the position shown in FIGURE 1 wherein the nipple 12 is separate from the housing 10, will be designated "the released position." The position shown in FIGURE 2 wherein the housing and the nipple are locked together will be designated "the engaged position."

With the coupling in the released position as shown in FIGURE 1, the locking balls 28 are positioned radially outwardly from the annular nipple-receiving chamber 24 so that they do not protrude inwardly beyond the cylindrical internal surface 14a of cylindrical body 14. The locking balls 28 are retained in the radially outward position by the release collar 42 which slides along the cylindrical internal surface 14a of cylindrical body 14 and prevents the locking balls 28 from moving radially inwardly. Since the locking balls are held radially outwardly by release collar 42, they protrude into the release groove 34 formed in the annular lock sleeve 30 and keep the annular lock sleeve 30 positioned to the left, as viewed in FIGURE 1, against the urging of coil spring 38 which tends to force the annular lock sleeve 30 to the right. When the annular lock sleeve 30 is locked in a position to the left as shown in FIGURE 1, the end of the lock sleeve interferes with the interlock cams 64 and prevents the valve stem 58 from being rotated to cause the master valve element 48 to open. Thus, in the released position shown in FIGURE 1, the master valve element 48 is locked closed by the position of annular lock sleeve 30 and interlock cams 64.

When the coupling is engaged, the nipple 12 is inserted into the housing 10. Initially, the nipple end 74 is inserted into the annular nipple-receiving chamber 24 between cylindrical flow passage 18 and cylindrical body 14. The nipple end 74 first contacts the release collar 42 which causes the release collar 42 to be moved toward the left (as viewed in FIGURES 1 and 2) against the urging of coil spring 44. This movement of the release collar 42 permits the locking balls 28 to move radially inwardly, first against the nipple end 74 and then down into the lock groove 78 formed in nipple end 74. The locking balls 28 are caused to move radially inwardly by the annular lock sleeve 30 which, when urged to the right by spring 38, causes the lock surface 32 on annular lock sleeve 30 to move axially over the locking balls 28 and force them down into the lock groove 78 on nipple end 74. Thus, the nipple and housing reach the position shown in FIGURE 2 wherein the nipple end 74 is locked into the housing by locking balls 28 and the annular lock sleeve 30 has moved to the right under the influence of spring 38 against the retaining nut 40 so that the lock surface 32 on annular lock sleeve 30 holds the locking balls 28 into the lock groove 78 on nipple end 74 to thereby lock the nipple 12 into the housing 10 in full 360° rotatable relationship.

When the annular lock sleeve 30 moves to the right as shown in FIGURE 2, the interlock cams 64 may then be rotated so that valve stem 58 can be rotated and the master valve element 48 can be opened as shown in FIGURE 2. The master valve element 48 contacts the slave valve element 90 in full 360° rotatable relationship and causes it to be moved axially against the force of spring 92 to the open position. If the nipple of FIGURE 8 is utilized, the master valve forces the slave valve element 90' axially against the force of spring 92'. Full fluid flow can then take place through the coupling. It may be seen (FIGURE 2) that the seal ring 76 contacts the flow passage 18 to seal the passage 18 to the nipple to prevent fluid from escaping into lock sleeve 30 and out of the housing.

It will be seen that when the master valve element 48 and the slave valve element 90 are opened as shown in FIGURE 2, the interlock cams 64 bear against the end of the annular lock sleeve 30 and maintain it in the lock position so that the lock surface 32 of annular lock sleeve 30 keeps the locking balls 28 forcefully urged into the locking groove 78 on nipple end 74. Thus, so long as the valves 48 and 90 are open, it is impossible to disconnect the nipple 12 from the housing 10.

If the nipple 12 is not fully inserted into the housing 10, opening the master valve element 48 causes the cam element 64 to forcefully urge the lock sleeve 30 to the fully locked position shown in FIGURE 2. Thus, the master valve element 48 and its interlocking cam element 64 serve to insure a fully inserted nipple and a fully locked relationship between housing 10 and nipple 12 before the master valve element 48 may be opened.

When it is desired to disconnect the coupling, the valve stem 58 must first be rotated to handle 66 so that the master valve element 48 is closed as shown in FIGURE 1. The master valve element 48 seats against its valve seat 20. When this occurs, the slave valve 90 seats against its valve seat 72 since spring 92 urges it to the closed position and the force of master valve element 48 has been withdrawn. Thus, the valves are closed. At that point the handles 36 on lock sleeve 30 may be grasped and the annular lock sleeve 30 may then be moved to the left as viewed in FIGURES 1 and 2 to the position shown in FIGURE 1. When the annular lock sleeve 30 reaches the position shown in FIGURE 1, the nipple 12 is ejected or may be pulled from the housing 10 and as the nipple end 74 is withdrawn from the annular nipple-receiving chamber 24, the release collar 42 will move toward the right as viewed in FIGURES 1 and 2 until it reaches the position shown in FIGURE 1. The annular release collar 42 will then hold the locking balls 28 radially outwardly so that they stay in the release groove 34 formed in annular lock sleeve 30. Annular lock sleeve 30 will then be held firm in the position shown in FIGURE 1 and it may not move to the right even though the spring 38 urges the lock sleeve 30 to the right. The annular lock sleeve 30 will be then locked in the position shown in FIGURE 1 and it will interfere with the interlock cams 64 so that the valve 48 may not be opened so long as the coupilng is separated.

It will be seen that I have provided a novel coupling which is particularly useful for tank truck and tank car loading. The nipple may be automatically inserted into the housing in a 360° rotatable, locked relationship. It will further be seen that my coupling is foolproof in that the valve may not be opened while the coupling is disconnected nor may the coupling be disconnected while the valve is open. It will be further seen that opening the valve will pull a partially inserted nipple into the point of full, locked insertion. Further, the nipple end portion, the part of the coupling which wears and is damaged most frequently, has been made so that it is replaceable. My coupling is relatively short in overall length. My coupling operates with flow in either direction and under vacuum or presure. From FIGURE 2 it may be seen that the total length of the assembled coupling may be less than twice its internal diameter of flow passage 18 within the housing 10.

According to the provision of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:
1. A valved swivel coupling for releasably and rotatably connecting first and second conduits into fluid communication with each other without spillage whereby said conduits are closed when said coupling is separated and whereby said conduits may be opened into fluid communication when said coupling is connected, said valved coupling comprising:
  (a) a housing in fluid communication with said first conduit, said housing including a fluid flow passage, an annular nipple-receiving chamber formed around said fluid flow passage and having a cylindrical internal surface adapted to receive a nipple having a cylindrical external surface; said chamber cylindrical internal surface having a plurality of radial passages formed therein to permit locking balls to protrude radially therefrom into said nipple-receiving chamber;
  (b) a nipple in fluid communication with said second conduit, said nipple having a cylindrical external surface adapted to be contiguous to said nipple-receiving chamber cylindrical internal surface when said coupling is assembled, said nipple being receivable within said housing in any rotated position relative to said housing, said nipple including a frusto-conical valve seat formed in the fluid flow passage through said nipple, and a valve retaining adapter positioned within said flow passage to receive a reciprocal valve stem; said nipple cylindrical external surface having an annular groove formed therein, said groove being axially aligned with said radial passages in said nipple-receiving chamber cylindrical internal surface when said nipple is inserted into said annular nipple-receiving chamber;
  (c) lock means for locking said nipple within said housing, whereby said nipple may swivel in 360° rotatable relationship to said housing said lock means comprising a plurality of locking balls positioned one in each of a like plurality of said radial passages formed in said nipple-receiving chamber cylindrical internal surface, an annular lock sleeve disposed radially outwardly from said locking balls and spring biased to a lock position wherein said balls are forced radially inwardly into said nipple-receiving chamber by a lock surface on said sleeve and reciprocable to a release position wherein said locking balls are moved radially outwardly from said nipple-receiving chamber and radially outwardly into a release groove formed in said annular lock sleeve, an annular release collar positioned within said nipple-receiving chamber and spring loaded to retain said locking balls in the radially outwardly released position until said nipple is inserted into said annular nipple-receiving chamber, said lock balls performing the dual function of locking said nipple within said housing when said annular lock sleeve is in the lock position and locking said annular lock sleeve in the release position when said nipple is not positioned within said housing;

(d) a master valve positioned within said housing, said master valve including a valve element movable between a closed position wherein said valve element closes said housing flow passage and an open position wherein said flow passage is open, said valve element operatively connected to a rotating valve stem rotatably journaled within said housing;

(e) a slave valve positioned within said nipple; said slave valve including a valve element adapted to be operatively connected to said master valve element when said coupling is assembled, said slave valve being open when said master valve is open and being closed when said master valve is closed;

(f) an interlock cam fixed to said master valve stem to accommodate said annular lock sleeve said interlock cam being of a shape to permit said lock means annular lock sleeve to reciprocate to the release position when said master valve element is closed but to prevent said annular lock sleeve to reciprocate to the release position when said master valve element is open, and said interlock cam being of such shape as to prevent said master valve from being opened when said annular lock collar is in the release position.

2. A valved swivel coupling for releasably and rotatably connecting first and second conduits into fluid communication with each other whereby said conduits are closed when said coupling is separated and whereby said conduits may be opened into fluid communication when said coupling is connected, said valved coupling comprising:

(a) a housing in fluid communication with said first conduit, said housing including a fluid flow passage having a valve seat formed on the end thereof, an annular nipple-receiving chamber formed around said fluid flow passage and having a cylindrical internal surface adapted to receive a nipple having a cylindrical external surface, said chamber cylindrical internal surface having a plurality of radial passages formed therein to permit locking balls to protrude radially therefrom into said nipple-receiving chamber;

(b) a nipple in fluid communication with said second conduit, said nipple having a cylindrical external surface adapted to be contiguous to said nipple-receiving chamber cylindrical internal surface when said coupling is assembled, said nipple being receivable within said housing in any rotated position relative to said housing, said nipple including a frusto-conical valve seat formed in the fluid flow passage through said nipple, and a valve retaining adapter positioned within said flow passage to receive a reciprocal valve stem, said nipple cylinder external surface having an annular groove formed therein, said groove being axially aligned with said radial passages in said nipple-receiving chamber cylindrical internal surface when said nipple is inserted into said annular nipple-receiving chamber;

(c) lock means for locking said nipple within said housing, whereby said nipple may swivel in 360° rotatable relationship to said housing, said lock means comprising a plurality of locking balls positioned one in each of a like plurality of said radial passages formed in said nipple-receiving chamber cylindrical internal surface, an annular lock sleeve disposed radially outwardly from said locking balls and spring biased to a lock position wherein said balls are forced radially inwardly into said nipple-receiving chamber by a lock surface on said sleeve and reciprocable to a release position wherein said locking balls are moved radially outwardly from said nipple-receiving chamber and radially outwardly into a release groove formed in said annular lock sleeve, an annular release collar positioned within said nipple-receiving chamber and spring loaded to retain said locking balls in the radially outwardly released position until said nipple is inserted into said annular nipple-receiving chamber, said lock balls performing the dual function of locking said nipple within said housing when said annular lock sleeve is in the lock position and locking said annular lock sleeve in the release position when said nipple is not positioned within said housing;

(d) a master valve positioned within said housing, said master valve including a valve element piloted within said housing fluid flow passage and reciprocable between a closed position wherein said valve element abuts said valve seat formed on the end of said fluid flow passage and an open position wherein said valve element is reciprocated away from said valve seat, a valve linkage connected to said valve element and connected to a rotating valve stem rotatably journaled within said housing, said valve stem operable upon rotation to close said valve element and to open said valve element through said valve linkage;

(e) a slave valve positioned within said nipple; said slave valve including a valve element adapted to contact said master valve element when said coupling is assembled, said valve element being spring loaded to abut said frusto-conical valve seat within said nipple and being forced away from said valve seat to the open position by movement of said master valve element, said valve element having a valve stem fixed thereto, said valve stem being reciprocably positioned within said adapter fixed within said nipple flow passage;

(f) an interlock cam fixed to said master valve stem to accommodate said annular lock sleeve, said interlock cam being of a shape to permit said lock means annular lock sleeve to reciprocate to the release position when said master valve element is closed against said master valve seat but to prevent said annular lock sleeve to reciprocate to the release position when said master valve element is open, and said interlock cam being of such shape as to prevent said master valve from being opened when said annular lock sleeve is in the release position.

3. A valved swivel coupling for releasably and rotatably connecting first and second conduits into fluid communication with each other whereby said conduits are closed when said coupling is separated and whereby said conduits may be opened into fluid communication when said coupling is connected, said valved coupling comprising:

(a) a housing in fluid communication with said first conduit, said housing including a fluid flow passage having a valve seat formed on the end thereof, an annular nipple-receiving chamber formed around said fluid flow passage and having a cylindrical internal surface adapted to receive a nipple having a cylindrical external surface, said chamber cylindrical internal surface having a plurality of radial passages formed therein to permit locking balls to protrude radially therefrom into said nipple-receiving chamber;

(b) a nipple in fluid communication with said second conduit, said nipple having a cylindrical external surface adapted to be contiguous to said nipple-receiving chamber cylindrical internal surface when said coupling is assembled, said nipple being receivable within said housing in any rotated position relative to said housing, said nipple including a frusto-conical valve seat formed in the fluid flow passage through said nipple, said nipple cylindrical external surface having an annular groove formed therein, said groove being axially aligned with said radial passages in said nipple-receiving chamber cylindrical internal surface when said nipple is inserted into said annular nipple-receiving chamber;

(c) lock means for locking said nipple within said housing whereby said nipple may swivel in 360° rotatable relationship to said housing, said lock means comprising a plurality of locking balls positioned one in each of a like plurality of said radial passages formed in said nipple-receiving chamber cylindrical internal surface, an annular lock sleeve disposed radially outwardly from said locking balls and spring biased to a lock position wherein said balls are forced radially inwardly into said nipple-receiving chamber by a lock surface on said sleeve and reciprocable to a release position wherein said locking balls are moved radially outwardly from said nipple-receiving chamber and radially outwardly into a release groove formed in said annular lock sleeve, an annular release collar positioned within said nipple-receiving chamber and spring loaded to retain said locking balls in the radially outwardly released position until said nipple is inserted into said annular nipple-receiving chamber, said lock balls performing the dual function of locking said nipple within said housing when said annular lock sleeve is in the lock position and locking said annular lock sleeve in the release position when said nipple is not positioned within said housing;

(d) a master valve positioned within said housing, said master valve including a valve element piloted within said housing fluid flow passage and reciprocable between a closed position wherein said valve element abuts said valve seat formed on the end of said fluid flow passage and an open position wherein said valve element is reciprocated away from said valve seat, a valve linkage connected to said valve element and connected to a rotating valve stem rotatably journaled within said housing, said valve stem operable upon rotation to close said valve element and to open said valve element through said valve linkage;

(e) a slave valve positioned within said nipple; said slave valve including a valve element adapted to contact said master valve element when said coupling is assembled, said valve element being spring loaded to abut said frusto-conical valve seat within said nipple and being forced away from said valve seat to the open position by movement of said master valve element, said valve element having a valve guide fixed thereto, said valve guide being reciprocably positioned to ride along the cylindrical internal surface of said nipple;

(f) an interlock cam fixed to said master valve stem to accommodate said annular lock sleeve, said interlock cam being of a shape to permit said lock means annular lock sleeve to reciprocate to the release position when said master valve element is closed against said master valve seat but to prevent said annular lock sleeve to reciprocate to the release position when said master valve element is open, and said interlock cam being of such shape as to prevent said master valve from being opened when said annular lock sleeve is in the release position.

References Cited

UNITED STATES PATENTS 3,168,125   2/1965   Rosell _____ 137—614.06 XR

WILLIAM F. O'DEA, *Primary Examiner.*

H. M. COHN, *Assistant Examiner.*